United States Patent [19]

Ha et al.

[11] 3,742,470

[45] June 26, 1973

[54] MEMORY DISC PACK DRIVE HAVING ACCURATE READ/WRITE HEAD POSITIONING

[75] Inventors: In W. Ha; Carl P. Hollstein, Jr.; Frank D. Ruble, all of San Jose, Calif.

[73] Assignee: Information Storage Systems, Inc., Cupertina, Calif.

[22] Filed: Dec. 30, 1971

[21] Appl. No.: 214,050

[52] U.S. Cl. .................... 340/174.1 B, 179/100.2 S

[51] Int. Cl. .......................................... G11b 21/10

[58] Field of Search ............. 340/174.1 C, 174.1 B; 179/100.2 MD, 100.2 S

[56] References Cited

UNITED STATES PATENTS

| | | | |
|---|---|---|---|
| 3,263,031 | 7/1966 | Welsh | 340/174.1 C |
| 3,651,500 | 3/1972 | Weir | 340/174.1 B |

*Primary Examiner*—Vincent P. Canney

*Attorney*—C. Michael Zimmerman, Gerald L. Moore et al.

[57] ABSTRACT

An apparatus is described which is incorporated into a memory disc pack drive mechanism to enable each read/write head thereof to be properly positioned with respect to corresponding disc pack recording surfaces. The positioning of each head is checked with the use of a test disc pack having a prerecorded data pattern at a prescribed reference location on each of its recording surfaces. The data pattern is made up of a pair of differing high frequency signals which are applied concentrically and quite close together on each surface, but eccentrically with respect to the axis of rotation of the surface. The head whose positioning is being checked is used to simultaneously pick up the pair of frequencies to generate an output signal having a repeating, closed loop tracing defining beat frequency null points and an envelope characteristic of the head alignment. The invention conditions the output signal to precisely delineate the envelope by separating such envelope from its carrier frequencies, and then differentiating the same to provide high resolution signals representative of the head positioning. The differentiated signal is shaped and adjacent portions of the resulting signal are superimposed and displayed on an oscilloscope to enable an operator to visually check the same to learn of any required adjustments to the head positioning.

8 Claims, 6 Drawing Figures

(ON TRACK)

(OFF TRACK)

INVENTORS.
IN W. HA
CARL P. HOLLSTEIN, JR.
FRANK D. RUBLE
BY [signature]
ATTORNEY

INVENTORS.
IN W. HA
BY CARL P. HOLLSTEIN, JR.
FRANK D. RUBLE

ATTORNEY

MEMORY DISC PACK DRIVE HAVING ACCURATE READ/WRITE HEAD POSITIONING

BACKGROUND OF THE INVENTION

The present invention relates to data memory and retrieval apparatuses and, more particularly, to an arrangement for such an apparatus which is to be used with a predetermined data pattern applied on a data storage surface to report the location of a data transfer device, such as a read/write head, with respect to a desired positioning thereof relative to the storage surface.

As the speed of computers and other data processing units has increased, there has been a strong demand that the speed with which data or information is transferable between data storage devices and the processing unit be correspondingly increased. For this reason, direct access data storage devices of the type employing a pack of rotating magnetic discs for recording and storing data are being widely adopted. Memories of this nature have the advantage of enabling information to be either transferred to, or removed from, randomly selected locations or tracks of the discs without the necessity of the memory having to serially "seek" the desired location, such as must be done with, for example, magnetic tape memories. To this end, random access disc pack memories rely on movement of a read/write head radially of a corresponding disc pack recording surface between different radial locations thereon. Each one of such locations corresponds with a generally circular track on the disc at which information can be stored and retrieved. The read/write heads for the recording surfaces, and their positioning mechanism are normally a part of the drive apparatus for rotating the disc pack.

Most data processing systems relying on disc packs for data storage have a plurality of disc drive apparatuses which are used simultaneously to provide the system with a greater data storage and retrieval capacity. Moreover, in most operations, it is necessary that the disc packs be interchangeable. That is, quite often the disc drive apparatus which is used to write information onto a disc pack is not the same drive apparatus which will later be used to read that information therefrom. For example, in many data processing operations, after data is entered onto a disc pack, the disc pack is removed from the drive apparatus and stored until such time as the data is needed. The drive apparatus which is then used to read the data from the pack may or may not be the same one which applied the data to the pack.

It will be appreciated that before disc pack interchangeability is possible or practical, the disc drive apparatuses in a data processing system must all have their read/write heads "aligned" i.e., the head track positioning of the various machines must correspond, so that an operator can be assured that the correct data will be read back from a disc pack irrespective of whether or not the drive apparatus performing the data pick-up is the same drive apparatus which applied the data on the disc pack. This alignment is commonly obtained with the use of a master reference disc pack, referred to in the art as a "customer engineer" disc pack. Such pack has a predetermined data pattern at a specific location thereon which, when read back by a read/write head, provides an output representative of the positioning of such head. A signal tracing of the output is visually displayed on, for example, an oscilloscope, and an operator reading the data from the pack can adjust the head to provide a particular signal tracing configuration. Thus, by using the test disc pack to position the heads of a plurality of drive apparatuses so that the signal tracing provided by all is the same, an operator can align the heads.

The predetermined pattern provided on the test disc pack is one made up of a pair of different high frequency signals which, when read back simultaneously by the particular read/write head in question, provides a combined carrier signal having beat frequency null points. The envelope of the carrier signal is commonly referred to in the art as a "cat's eye" pattern, in view of the similarity of any two adjacent cycles thereof to the outline of a cat's eye. The beat frequency null points are located between each pair of cycles or eyes, and it is the positioning of such null points or, in other words, the size of adjacent ones of the cycles or eyes, which provides the indication of the location of the head with respect to the desired track positioning.

The cat's eye pattern is normally displayed on an oscilloscope face for visual checking by an operator. Since the beat frequency null points are provided by the envelope of the high frequency carrier signal, though, they will not appear on the oscilloscope as precise points, but rather areas of some width and breadth. This lack of resolution of such points makes the operation of aligning a head on the basis of the visual determination of the location of a "null" somewhat imprecise. However, the positioning error which can result, i.e., ± 300 microinches, has been acceptable in the past. In this connection, it is common in the art to provide in the neighborhood of 100 tracks of information per radial inch of disc surface. This means that adjacent tracks have been spaced apart about 10 millinches. There is a strong demand, however, that the data capacity of data storage devices be increased. One of the more practical ways of increasing this capacity is to increase the density or number of tracks on which data can be stored. This results in each track being more closely spaced to adjacent tracks and with such a greater track density, greater precision in accurately aligning the heads of various drive apparatuses must be obtainable. For one thing, closer track spacing means that the usable width of each track, i.e., the width of the data signal which can be applied on the track, is reduced, and in order to assure that sufficient signal amplitude is obtained when the data is read back, the heads of all drives which might be used for readback must be accurately aligned with one another to assure that whichever drive is used for readback, the head thereof will be positioned right.

SUMMARY OF THE INVENTION

The present invention provides an arrangement which is includable as part of a disc drive apparatus and which provides the accurate reporting of the location of a read/write head with respect to a desired track positioning thereof, which is necessary to enable high track densities without affecting disc pack interchangeability. The arrangement provides such accuracy from the same signal output providing the beat frequency null points utilized in the past, whereby enabling the desired accurate alignment of heads without requiring a replacement of the test disc pack formally used for this purpose. To this end, the invention includes, in its basic aspects, means responsive to a reading by a data transfer device, e.g., a read/write head, of a predetermined data pattern from a data storage surface by generating therefrom a signal having at least a pair of states whose relationship to one another is indicative of the location of the data transfer device with respect to its desired positioning. Such signal is, for example, the same "cat's eye" signal which is normally read from the test data pattern already in use. As a particularly salient feature of the invention, it also includes comparison means for receiving the pair of signal states and comparing the same to provide an output which reports the location of the data transfer device with respect to its desired positioning. Most desirable, the comparison means includes means for superimposing signals representative of the pair of signal states so that an operator can visually determine from the superimposition whether or not the desired head positioning is achieved, and, if not, what changes might be necessary to achieve such head positioning. The superimposition is preferably adjusted so that the signals representative of the pair of signal states coincide with one another when the read/write head in question is at the desired positioning, and the degree of displacement of one of the signals from the other when the head is mislocated, is indicative of the amount and direction of such mislocation. It will be appreciated that an operator can precisely adjust a read/write head to assure that two signals exactly coincide with one another, i.e., one disappears behind the other, with use of the instant invention, much more readily than he can position a point having low resolution at a particular location on an oscilloscope face as has been done in the past.

As another salient feature of the instant invention, it includes means for conditioning the "cat's eye signal" to remove from it, its carrier signals and their effects responsible for the low resolution. Thus, the precision which can be obtained in positioning a head with use of the instant invention is double enhanced.

The invention includes other features and advantages which will be described or will become apparent from the following more detailed description of a preferred embodiment.

BRIEF DESCRIPTION OF THE DRAWINGS

With reference to the accompanying two sheets of drawing.

DETAILED DESCRIPTION OF THE PREFERRED EMBODIMENT

Figure 1:
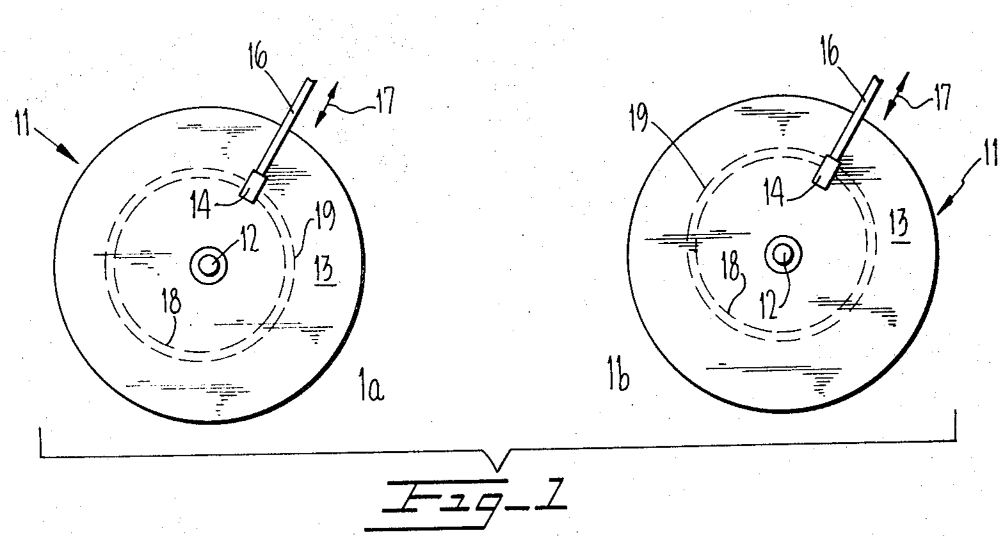
FIG. 1 is two plan views of the pertinent portion of a disc drive apparatus illustrating the same with a test disc pack having a predetermined test pattern thereon, FIG. 1*a* illustrating the relationship of the data test pattern to the location of a read/write head at one point in the revolution of the disc pack, and FIG. 2*a* illustrating such relationship after the disc pack has rotated through approximately 90° from the position shown in FIG. *1a;*

With reference first to FIG. 1, the pertinent portion of a data storage and recording apparatus of the type to which the present invention is particularly applicable is shown in perspective. More particularly, a disc pack 11 is mounted on a drive spindle 12 of a disc pack memory apparatus. The spindle 12 is rotated by a suitable drive mechanism (not shown) to thereby rotate the disc pack 11 such that each data storage surface thereof, exemplified by the circular surface thereof, is passed beneath a corresponding data transfer device, such as the read/write head 14. As is common, the head 14 is mounted on positioning mechanism, an arm 16 of which is shown, which provides controlled translation of the head radially of the disc in the directions represented by arrow 17. The positioning mechanism is capable of stopping and maintaining the head 14 at discrete radial locations along the disc, each of which corresponds to a circular track formed as the storage surface passes beneath the head at which data can be transferred between the head and the surface.

As mentioned before, for disc pack interchangeability, the heads of each drive apparatus in a storage system must be adjusted to be in position alignment with the heads of the other drive apparatuses of the system. This alignment of the heads is obtained during the manufacture or set-up process by utilizing a test disc pack on each of them which test pack has a predetermined test data pattern prerecorded thereon at a reference location.

The storage surface 13 of the illustrated disc pack 11 is a surface of such a test disc pack. That is, it has a predetermined data pattern applied to a test track which is spatially superimposed over one of the ordinary track positions, which is selected as a reference track. The data pattern can be read back by the head 14 to report the location of the head with respect to the reference location so that an operator can make the position adjustments necessary. The test track for reporting the position of the head is a generally circular track just as is the ordinary track location over which it is superimposed. However, such test track is eccentric with respect to the axis of rotation of the disc surface, i.e., the axis of the spindle 12, and thus is eccentric with respect to the ordinary track location.

The data pattern applied to the test track is composed of two separate high frequency signals which differ in frequency by a discernible but not too great amount. It is common to use frequencies of 1.24 and 1.25 megacycles for such separate signals. The concentric dotted lines 18 and 19 on the surface 13 of FIG. 1 represents such signals of the predetermined data pattern. As can be seen, they are applied quite close together on the eccentric test track.

During use of the test disc pack to properly position a head, the head is positioned coarsely by the apparatus at the conventional track over which the eccentric test track having the data pattern is superimposed. The head is then used to read the data pattern as the disc surface rotates in the conventional manner. The head will simultaneously pick up both of the high frequency signals and its output will be the summation of such signals. This summation will have beat frequency null points dependent upon the difference between the two frequencies. For example, when the two high frequencies are 1.24 and 1.25 megacycles as aforesaid, the beat frequency null points will appear every 10 kilocycles.

Because the two signals of differing frequencies are eccentric with respect to the axis of rotation of the disc surface, and the radial positioning thereof of such head, the distance of the data pattern signals from the head pickup location will vary during rotation of the pack. FIGS. 1*a* and 1*b* illustrate the pack at two angular positions which are 90° apart from one another to show this distance variation. Such distance variation will be a cyclic variation with one cycle thereof being produced each revolution of the surface with respect to the head. Since the amplitude of the signals picked up by the head 14 will depend upon the distance of such signals from the head, a corresponding cyclical variation will be caused in the amplitude of the combined data signal as read by the head.

Figure 2:
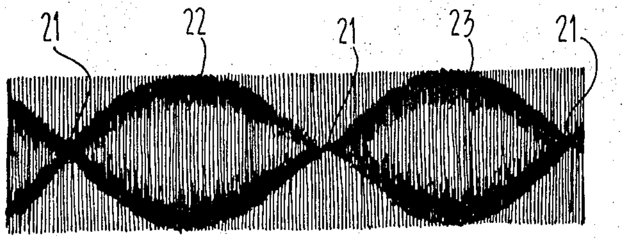
FIG. 2 illustrates a typical "cat's eye" signal tracing as the same would appear with its carrier signals on an oscilloscope face when the read/write head reading the test data pattern is properly positioned at a desired track location.
Figure 3:
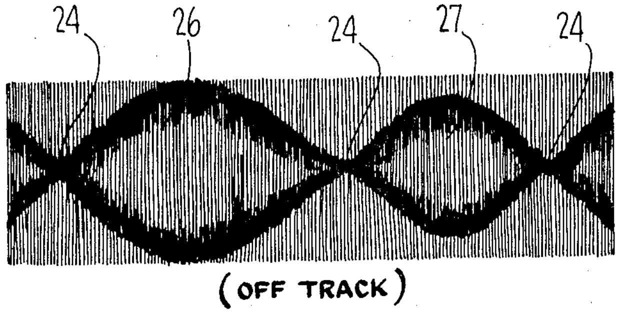
FIG. 3 is an illustration of a typical "cat's eye" signal tracing on an oscilloscope face when the read/write head providing the reading of the test data pattern is not properly positioned.

Signal tracings of typical outputs of the head reading the test pattern are illustrated in FIGS. 2 and 3. As is shown, the envelope of the combined signal obtained from the simultaneous reading of the two high frequency signals has a repeating closed loop form similar to a pair of cat's eyes. FIG. 2 depicts the output when the head is properly aligned with respect to the desired track location. In this figure, the beat frequency null points 21 are equally spaced apart on the time scale, and the cat's eyes 22 and 23 have equal amplitudes. When the head is not properly positioned with respect to the desired track over which the test track data pattern is superimposed, the beat frequency null points will be unevenly spaced apart as is represented by the null points 24 in FIG. 3, and the signal envelope forming the cat's eyes 26 and 27 will have unequal amplitudes for each of the cat's eyes. It has been the practice in the past for an operator to view the cat's eye signal tracing on a visual display output device such as an oscilloscope. If the display viewed is not substantially identical to that shown in FIG. 2, the operator will adjust the positioning of the head with respect to its actuation mechanism and, hence, with respect to the data surface, in order to achieve such a display.

It will be recognized that since the signal providing the cat's eye outline is really an envelope of the combined signals, the signal is not highly resolved, and the operator must make a subjective determination as to just what constitutes the precise null points and when such points are spaced apart equally. As mentioned before, this lack of resolution did not present a problem in the past since, with the distances adjacent tracks are conventionally spaced apart, the slight misalignment which might occur between the heads of different machines has not affected interchangeability. However, due to significant advances which have been made in the field, it is now possible to crowd adjacent tracks much closer together, and potential head alignment error is no longer tolerable.

Figure 4:
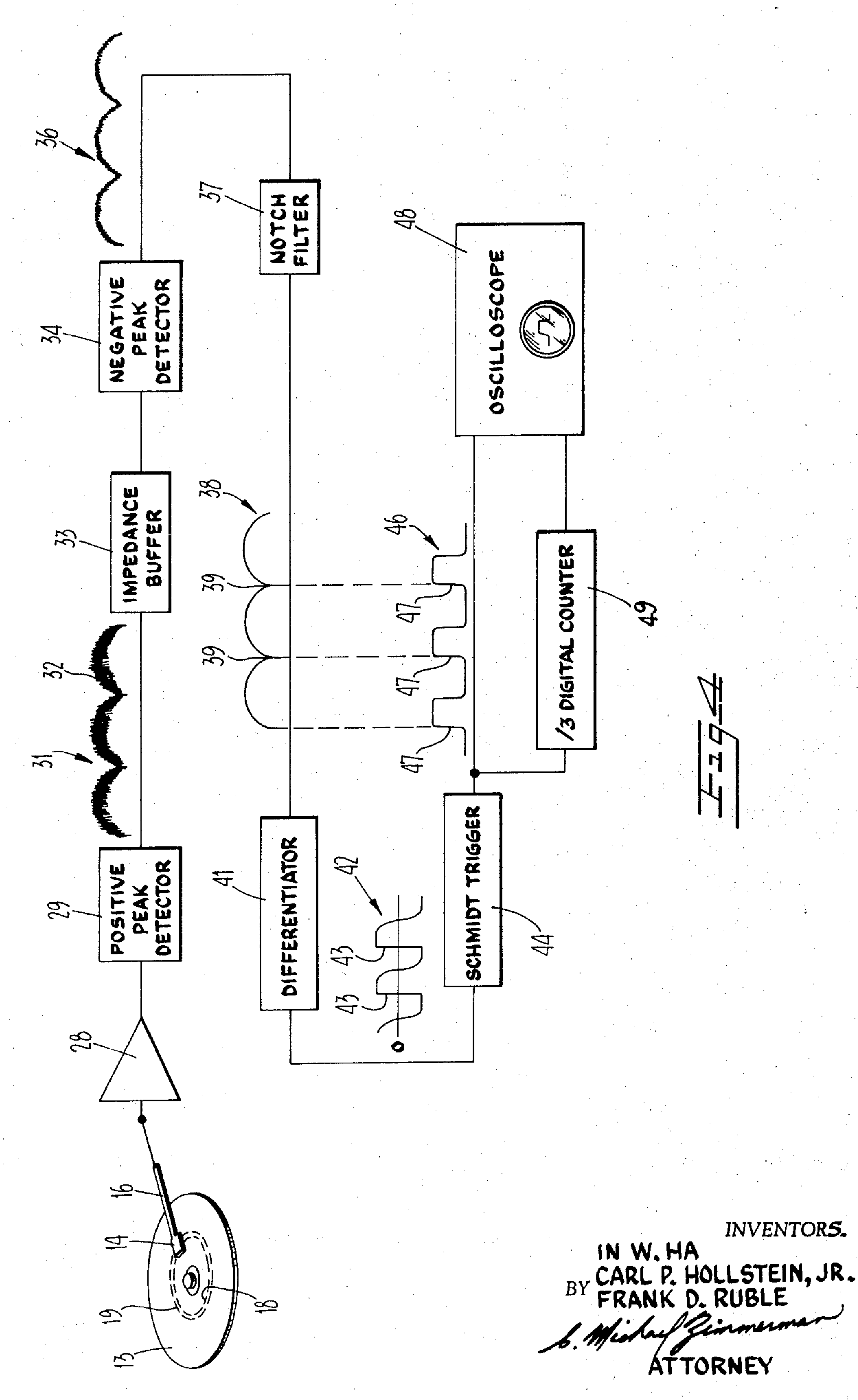
FIG. 4 is a block diagram of a preferred embodiment of the apparatus of the invention which accurately reports the location of a read/write head with respect to a desired track positioning thereof.

The present invention makes use of a conventional test disc pack in providing the more accurate head position reporting necessary to prevent any significant head alignment error. To this end, the invention includes apparatus for receiving the cat's eye signal and conditioning the same to provide more precise delineation of the closed curve envelopes and the null or junction points therebetween. FIG. 4 illustrates a preferred embodiment of the invention in combination with a disc drive mechanism. In this connection, a test disc pack surface 13 is illustrated in perspective having the predetermined test pattern eccentrically applied to its surface. The head 14 of the mechanism is positioned to pick up the data pattern and its output is fed, as is conventional, to a read amplifier represented at 28.

The output of amplifier 28 will be the various carrier signals making up the cat's eye pattern of FIGS. 2 and 3. Since the relationship of successive null points of the signal, or of successive cyclical waveforms of the envelope, provides an indication of the location of the head with respect to its desired positioning, the read amplifier acts, in effect, as means responsive to a reading by the head 14 of the data pattern, by generating therefrom a signal having a pair of states whose relationship to one another is indicative of the location of the head with respect to the desired positioning.

In keeping with the invention, the signal from read amplifier 28 is fed into means for separating the envelope from the carrier signals and for rectifying the same. That is, the output from the read amplifier is delivered to a positive peak detector 29 which detects the positive peaks of the combined signal produced from the automatic summation of the two high frequency signals obtained from the data represented by the lines 18 and 19. Since it is the peaks of the combined signal which define its envelope, the detector thus acts to detect such envelope or, in other words, separate the same from the combined signal. And because the peak detector only detects the positive peaks of the combined carrier signal it also acts to rectify the cat's eye signal so that only the positive portion thereof is represented at its output.

The signal tracing 31 represents the output of detector 29. As is illustrated, such signal includes not only the positive portion of the cat's eye envelope, but also a signal 32 representative of the difference frequency between the summed high frequency signals generated from the data picked up by head 14. This output signal is passed through a protective impedance buffer 33 into a negative peak detector 34. Detector 34 detects the negative peaks of the difference frequency 32, to thereby separate the same from the cat's eye envelope. Both the negative peak detector 34 and the positive peak detector 29 can respectively be, as is conventional, a fast charging capacitance which is charged by the signal being detected to the peak thereof being detected. The discharge rate of the capacitance should be selected so that the peak detection signal will follow the positive portion of the varying envelope signal.

The output of negative peak detector 34 is represented by the signal tracing 36. As is illustrated, such signal includes high frequency components, e.g., the carrier signal peaks, along the envelope signal. In order to remove such residual high frequency components, the output of the negative peak detector 34 is fed into a "notch" filter 37 which passes all portions of the signal, except for the difference frequency. The resulting output signal represented by tracing 38 is a sharply defined, rectified signal representative of the upper half portions of the cat's eye envelope. It will be appreciated that because the carrier signals have been removed, they do not interfere with a precise determination of the relative locations of the beat frequency null points 39. That is, the lack of resolution of such null points caused by the carrier signals is eliminated.

While the signal tracing 38 can itself be displayed to enable a visual determination of head position, for best results it is desirable that signal states thereof representative of the head position be enhanced for comparison purposes. To this end, the signal is fed into a differentiator 41 which produces from the signal an output representative of the slope on a time scale of such signal. Because the signal 38 is a rectified portion of the cat's eye signal, the various null points 39 represent points at which the slope abruptly changes from a negative to a positive slope. The output signal of the differentiator 41, represented by the signal tracking 42, will therefore have generally vertical lines, such as the lines 43, representing the null points. These vertical lines 43 are, in effect, amplified or enhanced versions of the null points.

Again, although the signal 42 can be visually displayed for use by an operator in positioning a head, more precise results are obtainable by electronically comparing successive portions of such signal representative of the head alignment. This comparison is most aptly obtained by superimposing one cycle of the differentiated signal 42 either onto an adjacent cycle thereof or one that is spaced in time an odd number of cycles therefrom. To provide even better delineation of the differentiated signal, it is shaped prior to cycles thereof being superimposed and displayed. That is, the differentiated signal is fed into a schmidt trigger represented at 44 which forms a square wave pulse upon each rise of the potential of the differentiated signal beyond a threshold value in the potential range represented by the lines 43. More particularly, a square wave pulse signal 46 is formed by the trigger with the leading edge 47 of each square wave pulse thereof coinciding in time with the vertical lines of the differentiated signal.

The outputs of schmidt trigger 44 is applied to the display terminals of an oscilloscope schematically represented at 48. The sweep time of the oscilloscope is then adjusted to cause every third pulse to be displayed on the oscilloscope face or in other words, superimposed on one another. This is simply done by synchronizing the seek of the cathode ray tube with each third abrupt change in the slope of the signal. As a simple manner of accomplishing this, the output of the schmidt trigger is fed into a decremental digital counter 48 which will trigger the sweep of the oscilloscope upon receipt by it of the leading edge of every third pulse.

Figure 5:
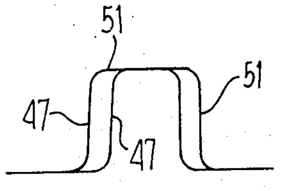
FIG. 5 is a typical display output provided by the preferred embodiment of the apparatus when the read/write head in question is not located at the test track.

FIG. 5 illustrates a typical signal tracing of two successive portions 51 (each third pulse) of the signal 46 superimposed on one another, as they would appear on an oscilloscope display face. It will be remembered that each of the pulses of the signals 46 corresponds in time to one of the cycles of the rectified envelope signal 38. Thus, the spacing in time between successive sweeps by the oscilloscope will depend upon the spacing in time of the null points 39 of the signal 38. Thus, in those instances in which the null points are not equally spaced apart, i.e., the head is not correctly aligned with respect to its desired track positioning, the superimposition of the successive portions of the signal will not result in the displayed pulses coinciding with one another. Rather, they will be displaced as is typically illustrated in FIG. 5. This displacement will inform an operator that the null points of the signal, 38 and, hence, the cat's eye signal are not equally spaced apart and the head is therefore not properly positioned. The operator can then adjust the head relative to the positioning mechanism to bring the two displayed portions of the signal 46, i.e., the pulses, into coincidence with one another. This will indicate that proper positioning has been obtained.

It readily will be recognized that an operator is better able to visually determine when the two displayed pulses are coincident with one another, then he can visually determine whether or not null points are equally spaced apart. Thus, the superimposition of the pulses for comparison enables even a more precise determination of head positioning than the use of the separated envelope signal 38 as aforesaid.

Figure 6:
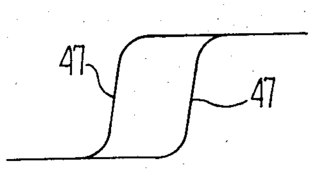
FIG. 6 is an expanded form of the display output of FIG. 5 which is obtainable with the instant invention for even more accuracy.

The superimposition for comparison of portions of the differentiated signal, or the pulses derived therefrom also enables an operator to utilize the time expansion characteristics of an oscilloscope to enhance the accuracy obtainable. More particularly, the operator can adjust the time scale of the oscilloscope to widen the display of those portions of the pulses which include the leading edges 47. FIG. 6 depicts such edges on such an expanded time scale. It will be appreciated that when the operator adjusts the alignment of a head to bring the edges of the expanded pulses into coincidence, precise head positioning without significant error is assured. It will also be recognized that if the expanded time scale of an oscilloscope was used in the past to expand a cat's eye signal, the expansion would only increase the lack of resolution at the null points, rather than more precisely provide an indication of their relative locations.

In one particular embodiment of the invention it has been found that because of the more precise reporting of the orientation of a head obtainable with the instant invention, an operator can position a head at a desired track location with at least three times the accuracy he can using an unconditioned cat's eye signal. The instant invention provides this better accuracy while still enabling use of conventional test disc packs.

Although the invention has been described in connection with a preferred embodiment thereof, it will be appreciated by those skilled in the art that various changes and modifications can be made without departing from its scope. For example, although the arrangement described provides separation of the positive portions of the cat's eye envelope from the carrier signals thereof, equally as good results can be obtained by separating the negative portion of the cat's eye envelope from its carrier signal and then otherwise conditioning the same in accordance with the invention. It is therefore intended that the coverage afforded applicant be limited only by the claims.

We claim:

1. Apparatus for use in conjunction with a predetermined data pattern applied to a data storage surface in reporting the location of a data transfer device with respect to a desired positioning thereof relative to said data storage surface, comprising means responsive to a reading by said data transfer device of said data pattern by generating therefrom a signal having at least a pair of states whose relationship to one another is indicative of the location of said data transfer device with respect to said desired positioning, and comparison means for receiving said pair of signal states and comparing the same to provide an output reporting said location of said data transfer device with respect to said desired positioning wherein said means for generating a signal in response to a reading by said transfer device of said data pattern generates such a signal having a cyclical waveform with the relationship of predetermined cycle positions thereof providing said indication of said location of said data transfer device with respect to said desired positioning, wherein said comparison means includes means for superimposing signals representative of said predetermined cycle positions on one another to provide said comparison of the same.

2. The apparatus of claim 1 for reporting the location of a data transfer device with respect to a desired positioning thereof wherein said output provided by said comparison means is a visual display output from which an operator can perceive the relationship of said superimposed signals to obtain said indication of the location of said data transfer device with respect to said desired positioning.

3. The apparatus of claim 2 for reporting the location of a data transfer device with respect to a desired positioning thereof wherein the relationship of said superimposed signals providing said indication of said location with respect to said desired positioning is the displacement of one of said signals from the other.

4. Apparatus for use in conjunction with a predetermined data pattern applied to a data storage surface in reporting the location of a data transfer device with respect to a desired positioning thereof relative to said data storage surface, comprising means responsive to a reading by said data transfer device of said data pattern by generating therefrom a signal having at least one pair of states whose relationship to one another is indicative of the location of said data transfer device with respect to said desired positioning, and comparison means for receiving said pair of signal states and comparing the same to provide an output reporting said location of said data transfer device with respect to said desired positioning, and wherein said desired positioning is the proper position of said transfer device with respect to said surface for transferring data to a predetermined track location thereon, said predetermined data pattern is one applied to said data storage surface on a test track which is superimposed spacially along said track location, and said means for generating a signal in response to a reading by said transfer device of said data pattern generates such a signal having a cyclical waveform whose amplitude at any given time is a function of the location of said transfer device relative to said data pattern on said test track and hence relative to said desired track positioning wherein said data storage surface is mounted for rotation for the reading therefrom during its rotation of data thereon by said data transfer device; said test track having said predetermined data pattern is generally circular and eccentric with respect to the axis of rotation of said surface whereby upon the rotation of said surface with respect to said transfer device, the distance of said data pattern from said transfer device will vary cyclically with each revolution of said surface to cause a corresponding cyclical variation in the amplitude of the signal generated from said pattern by said signal generating means; and said comparison means includes means for superimposing signal representative of one-half cycle portions of said signal generated from said data pattern on one another to provide said comparison of the same.

5. Apparatus for use in conjunction with a predetermined data pattern applied to a data storage surface in reporting the location of a data transfer device with respect to a desired positioning thereof relative to said data storage surface, comprising means responsive to a reading by said data transfer device of said data pattern by generating therefrom a signal having at least a pair of states whose relationship to one another is indicative of the location of said data transfer device with respect to said desired positioning, and comparison means for receiving said pair of signal states and comparing the same to provide an output reporting said location of said data transfer device with respect to said desired positioning and wherein said desired positioning is the proper position of said transfer device with respect to said surface for transferring data to a predetermined track location thereon, said predetermined data pattern is one applied to said data storage surface on a test track which is superimposed spacially along said track location, and said means for generating a signal in response to a reading by said transfer device of said data pattern generates such a signal having a cyclical waveform whose amplitude at any given time is a function of the location of said transfer device relative to said data pattern on said test track and hence relative to said desired track positioning wherein said data storage surface is mounted for rotation for the reading therefrom during its rotation of data thereon by said data transfer device; said test track having said predetermined data is generally circular and eccentric with respect to the axis of rotation of said surface with said pattern being comprised of a pair of concentric but separated data signals applied on said test track with different frequencies, the summation of such data signals upon simultaneous reading thereof by said data transfer device during rotation of said surface providing a combined carrier signal whose envelope defines for each revolution of said surface with respect to said head of a pair of closed curves meeting at a junction point determined by the beat frequency null of said combined signal and the location of which on a time scale is representative of the location of said data transfer device with respect to the desired track positioning, and said comparison means includes means for deriving from each of said closed curve envelopes signals representative of the same and means for superimposing one of said signals on another to provide said comparison.

6. The apparatus of claim 5 for reporting the location of a data transfer device with respect to a desired positioning thereof wherein said means for deriving from each of said closed curves a signal representative thereof includes means for detecting the envelope of either the positive or negative portion of said combined signal to provide a recitified signal therefrom having an abruptly changing slope at said null points and for separing said envelope portion from the carrier frequencies thereof, and means for differentiating said rectified signal to provide a signal amplifying said abrupt change of slope.

7. The apparatus of claim 6 for reporting the location of a data transfer device with respect to a desired positioning thereof wherein said output provided by said comparison means is a visual display output on a cathode ray tube face, and means are included for synchronizing the sweep of said cathode ray tube with each abrupt change in the slope of said signal to thereby superimpose on said cathode ray tube face those portions of said signal representative of adjacent ones of said envelope signal.

8. The apparatus of claim 7 for reporting the location of a data transfer device with respect to a desired positioning thereof wherein said means for synchronizing the sweep of said cathode ray tube with each abrupt change in the slope of said signal includes counting means responsive to receipt of a predetermined number of abrupt changes in slope by providing a triggering signal which is usable to trigger the sweeping of said cathode ray tube.

* * * * *